June 30, 1942.   G. TRAUTVETTER   2,288,577
VEHICLE DOOR AND METHOD OF MAKING THE SAME
Filed Sept. 23, 1937   2 Sheets-Sheet 2
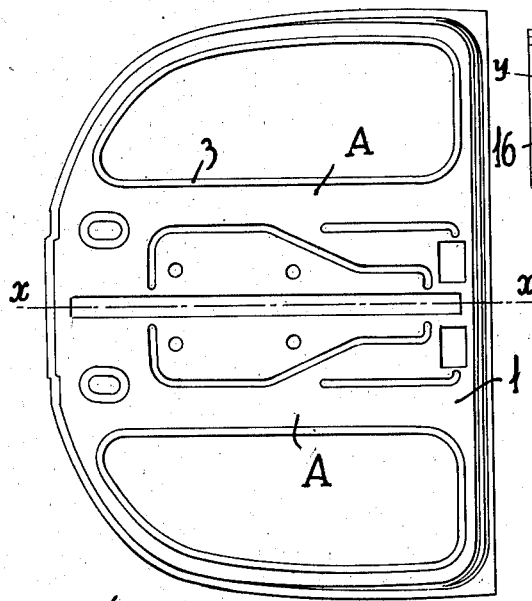
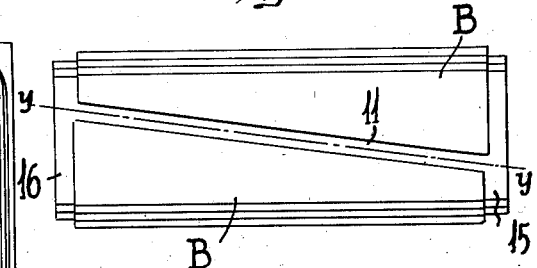
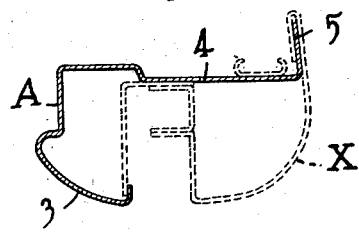
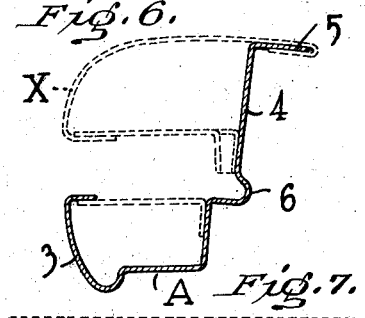
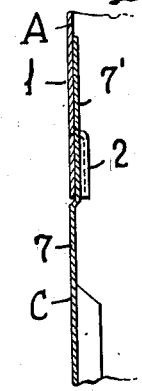
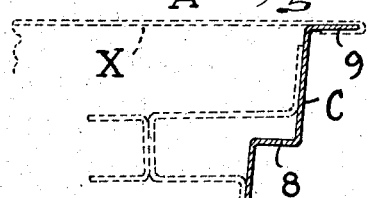
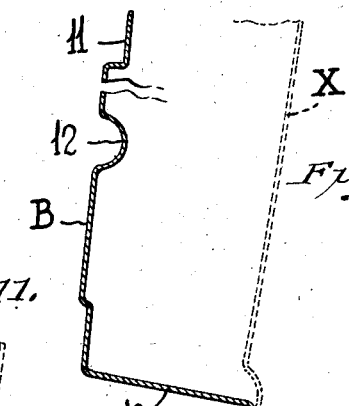
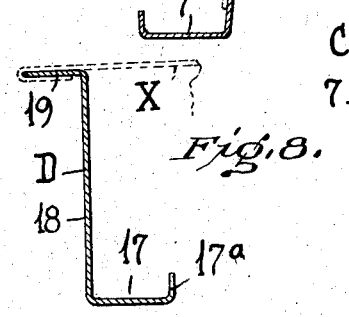
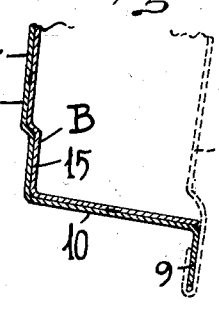
INVENTOR.
George Trautvetter
BY
ATTORNEY.

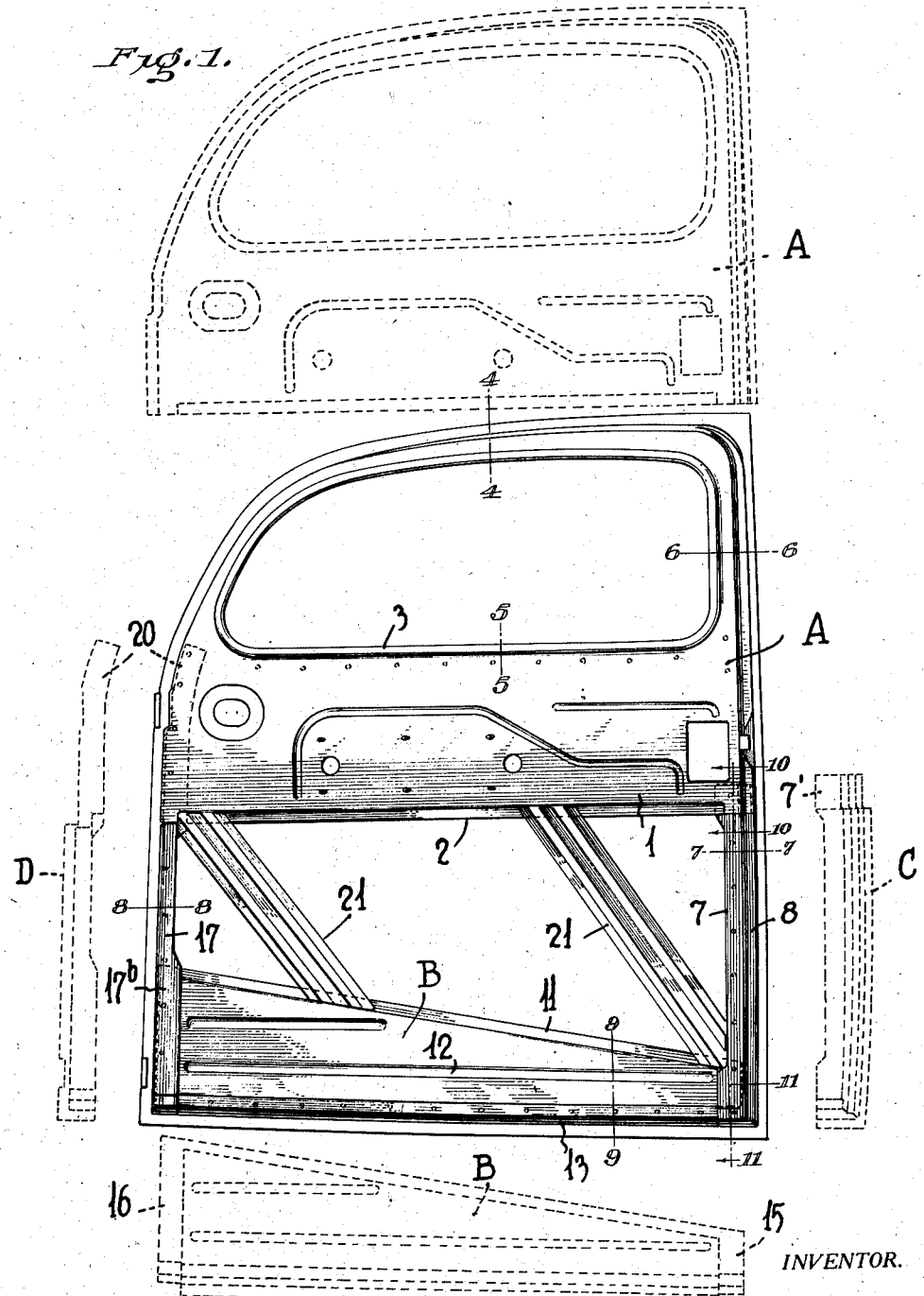

Patented June 30, 1942

2,288,577

UNITED STATES PATENT OFFICE 2,288,577

VEHICLE DOOR AND METHOD OF MAKING THE SAME

George Trautvetter, Philadelphia, Pa., assignor to Edward G. Budd Manufacturing Company, Philadelphia, Pa., a corporation of Pennsylvania Application September 23, 1937, Serial No. 165,302

6 Claims. (Cl. 296—44)

This invention relates to built-up sheet metal doors, and more particularly to vehicle doors of this character.

Sheet metal doors for vehicles as usually constructed comprise inner and outer panels united around their edges, each panel being formed of a one-piece stamping.

In view of the fact, however, that the inner panel of such doors is ordinarily covered with stiff fiber board or the like and upholstery material, it is not necessary that such inner panel should present a continuous and unbroken surface.

I therefore propose to construct the inner panel of such doors of two separate sections, spaced apart and suitably united. This has the advantage that each of these sections, being formed independently, may be stamped from smaller sheets of material. Moreover, a substantial saving in material results because of the relatively large open space provided between the two sections, which space, in the old constructions, is filled with metal. My improved door is also lighter than those in which the inner panel is continuous.

In order that the invention may be readily understood, reference is had to the accompanying drawings forming part of this specification, and in which—

Fig. 1 is an inside elevation of my improved built-up inner panel complete, the component parts thereof being shown separately in dotted lines;

Fig. 2 is a view illustrating how a pair of the upper sections of my improved built-up panel may be formed from an integral blank by a single stamping operation;

Fig. 3 is a similar view showing how a pair of the lower sections of my improved built-up panel can be formed from a single stamping;

Fig. 4 is a transverse section on the line 4—4 of Fig. 1, the inner panel being shown in full, and parts of the outer panel and other parts being shown in dotted lines; and Figs. 5, 6, 7, 8, 9, 10, and 11 are similar sections substantially on the lines 5—5, 6—6, 7—7, 8—8, 9—9, 10—10, and 11—11 of Fig. 1.

Referring to the drawings in detail, my improved built-up inner panel as shown in Fig. 1 comprises an upper section A having the window opening, a lower section B and a pair of side rails or frame members C and D, connecting the upper and lower sections at their edges.

The upper section comprises the usual lockboard 1 having at its lower edge a depressed flange 2, and around the window opening is formed an integral garnish molding 3.

As shown in Figs. 4 and 6, the upper section comprises a peripheral portion 4 having at its edge an upturned or out-turned flange 5 over which the edge of the outer panel is crimped, as usual. As shown in Fig. 6 the edge portion 4 is preferably bent out to form a bead 6, which cooperates with the door post.

In Fig. 5 the garnish molding 3 and the outer panel X are shown as spaced apart to provide the usual runway for the glass window.

The lower section B is shown as having an inclined upper edge formed with a depressed flange 11, lying substantially in the plane of the flange 2, and with one or more pressed up ribs 12 to give it stiffness. The lower section is formed at its lower side with a portion 13 constituting the bottom edge of the door, at the inside of which is formed a depending marginal flange 14 around which the lower edge of the outer panel X is crimped as usual. This is clearly shown in Fig. 9.

At the lock edge of the door the upper and lower sections of the inner panel are united by means of a side rail or frame member C. This, as shown in Fig. 7, comprises an inner portion 7, and a side portion 8, preferably having an offset therein to cooperate with the post, the outer edge of this side portion being provided with an outwardly extending flange 9 around which the outer panel X is crimped. The upper end of the side rail C is specially shaped as at 7' to fit under the edge of the upper section A and be secured thereto as shown in Figs. 1 and 10. At its lower end the side rail C overlies and is secured to the end of the lower section B, the lower end of the side rail C being bent around to conform with the lower edge of the door as shown at 10 in Fig. 11, and being formed at its extreme edge with a depending flange 9 around which the lower edge of the outer panel X is crimped. The parts are preferably united as by spot-welding.

At the hinge edge of the door, the upper and lower sections of the inner panel are united by means of a side rail or frame member D, which, as shown in Fig. 8, is substantially Z-shaped in cross-section, comprising an inner portion 17, an edge portion 18, and an out-turned flange 19 around which the outer panel X is crimped. In the space between the upper and lower sections, the portion 17 of the side rail D is preferably provided with an inturned marginal flange 17ª, but this is flattened out at that portion of the side rail which overlaps and is secured to the section B, as shown at 17$^b$. The upper end of the side rail D terminates in a specially formed portion 20 which fits inside of and is secured to the upper section A.

In addition to the side rails C and D, I preferably further brace and connect the upper and lower sections of my improved built-up inner panel by means of diagonally extending members 21, which may conveniently be formed of longitudinally corrugated sheet metal strips. These are secured to the flanges 2 and 11 as by welding.

Thus the upper and lower sections A and B are rigidly united and a continuous edge provided around the entire inner panel, while at the same time the metal which, in previous constructions, would occupy the space between the two sections, is, in my improved built-up construction, saved.

By reference to Fig. 2 it will be seen that a pair of my improved upper sections A can readily be formed integral with each other by means of a single stamping operation, the two sections being then cut apart along the median line $x$—$x$.

Similarly, by reference to Fig. 3, it will be seen that a pair of the lower sections B of my improved composite inner panel can be formed integral with each other by a single stamping operation, the two sections being then separated by cutting along the diagonal line $y$—$y$.

Also as shown in Fig. 3, it will be seen that the ends of each section B are provided with off-set extensions 15 and 16 over which fit the portions 7 and 17$^b$ of the side rails C and D respectively.

What I claim is:

1. In a sheet metal door comprising inner and outer panels and having a window opening, an inner panel being made up of an upper one-piece stamping containing the window opening and being provided along its upper edge and its substantially vertical edges with outwardly extending flanges forming the top rail and the upper sections of the side rails of the door frame, of a separate lower stamping being spaced from said upper section and forming the lower door rail, and of two further separate stampings forming the lower sections of the side rails of the door, the upper ends of said last-named stampings being rigidly connected to the lower ends of said upper side rail sections and the lower ends of said last-named stampings being rigidly connected to the ends of said lower stamping.

2. In a sheet metal door comprising inner and outer panels and having a window opening, an inner panel being made up of an upper one-piece stamping containing the window opening, forming below this opening a lock-board and being provided along its upper edge and its substantially vertical edges with outwardly extending flanges forming the top rail and the upper sections of the side rails of the door frame, of a separate lower stamping being spaced from said upper stamping and forming the lower door rail, and of two further separate stampings forming the lower sections of the side rails of the door, the upper ends of said last-named stampings being rigidly connected to the lower ends of said upper side rail sections and the lower ends of said last-named stampings being rigidly connected to the ends of said lower stamping.

3. In a sheet metal door comprising inner and outer panels and having a window opening, an inner panel being made up of an upper one-piece stamping containing the window opening and being provided along its upper edge and its substantially vertical edges with outwardly extending flanges forming the top rail and the upper sections of the side rails of the door frame, of a separate lower stamping being spaced from said upper stamping and forming the lower door rail, and of two further stampings forming the lower sections of the side rails of the door, the upper ends of said last-named stampings being rigidly connected to the lower ends of said upper side rail sections and the lower ends of said last-named stampings being rigidly connected to the ends of said lower stamping, one of said last-named separate stampings and one of the flanges of the upper one-piece stamping overlapping each other for a considerable part of their lengths as to form a reinforced rail structure adapted for the attachment of a door hinge.

4. In a door having inside and outside walls, the combination of a sheet metal panel member provided with a window opening therein and forming the upper portion of the inside wall and of the door frame, and additional sheet metal members forming the lower portion of the door frame, said additional sheet metal members including a pair of generally vertical door frame rails, said rails overlapping with and being rigidly connected to said upper sheet metal panel member, at least one of said members being in the region of the overlap inwardly displaced by substantially the thickness of the overlapping member so that both members present a substantially smooth interior surface.

5. In a door having inside and outside walls, the combination of a sheet metal panel provided with a window opening therein and forming the upper portion of the inside wall and of the door rails, and additional sheet metal members overlapping with and rigidly connected to said upper portion and forming the lower portion of the door frame, the overlapped portions of said door constituting reinforcements in the regions customarily used for the attachment of means, such as hinges for holding said door in place.

6. In a door having a generally vertical side door frame member and a bottom door frame member, said two members overlapping and being connected with each other at one corner of the frame, one of said members being formed so as to extend around and form the corner of the door where it overlaps the other member.

GEORGE TRAUTVETTER.